(12) United States Patent
Portolani et al.

(10) Patent No.: US 8,027,354 B1
(45) Date of Patent: Sep. 27, 2011

(54) NETWORK CONSOLIDATION FOR VIRTUALIZED SERVERS

(75) Inventors: Maurizio Portolani, Rolle (CH); Christian Elsen, Rolle (CH)

(73) Assignee: Cisco Technology, Inc., San Jose, CA (US)

( * ) Notice: Subject to any disclaimer, the term of this patent is extended or adjusted under 35 U.S.C. 154(b) by 181 days.

(21) Appl. No.: 12/432,532

(22) Filed: Apr. 29, 2009

(51) Int. Cl.
*H04L 12/28* (2006.01)
(52) U.S. Cl. .............. 370/431; 370/395.2; 370/395.21
(58) Field of Classification Search .................. None
See application file for complete search history.

(56) References Cited

U.S. PATENT DOCUMENTS

| | | | |
|---|---|---|---|
| 6,678,248 B1 * | 1/2004 | Haddock et al. | 370/235 |
| 7,080,378 B1 * | 7/2006 | Noland et al. | 718/104 |
| 2007/0104210 A1 * | 5/2007 | Wu et al. | 370/412 |
| 2009/0260074 A1 * | 10/2009 | De Spiegeleer | 726/15 |
| 2010/0217868 A1 * | 8/2010 | Heller, Jr. | 709/226 |

* cited by examiner

*Primary Examiner* — Ayaz Sheikh
*Assistant Examiner* — Blanche Wong
(74) *Attorney, Agent, or Firm* — Patterson & Sheridan LLP

(57) ABSTRACT

Techniques are disclosed for virtualized server kernel and virtual networks consolidation. The network consolidation allows a data center to migrate from an infrastructure that uses multiple dedicated gigabit Ethernet Network Adapters to manage system virtualization and migration to an infrastructure using consolidated, redundant, 10 gigabit Ethernet adapters. Different priority classes may be defined for different classes of network traffic such as hypervisor management traffic, inter-host virtual machine migration traffic, virtual machine production traffic, virtualized switching control plane traffic, etc. Further, an enhanced transmission standard may be used to specify a minimum bandwidth guarantee for certain traffic classes. Thus, the hypervisor management and inter-host virtual machine migration traffic may be transmitted, even the presence of congestion.

25 Claims, 5 Drawing Sheets

NETWORK CONSOLIDATION FOR VIRTUALIZED SERVERS

BACKGROUND

1. Technical Field

Embodiments described in this disclosure generally relate to techniques for managing servers running multiple virtual machines in a data-center environment. More specifically, embodiments described in this disclosure relate to virtualized servers kernel and virtual networks consolidation.

2. Description of the Related Art

Server virtualization technology allows multiple virtual machines to run concurrently on a single physical computing system. Currently, data center environments are used to create large clusters of such physical computing systems (commonly referred to as servers), where each server runs multiple virtual machines. This approach has led to data centers that can supply massive amounts of computing power. At the same time, the networking infrastructure to manage such a data center has grown ever more complex.

From a networking perspective, server virtualization requires the use of several Network Interface Cards (NICs) and Host Bus Adapters (HBAs). A typical configuration requires multiple NIC cards for server production traffic (at least 2 for redundancy), one NIC for management, one NIC used for memory copy operations during the migration of virtual machines, potentially one NIC for heartbeats when clustering is used, at least 2 HBAs for storage access, and finally separate NICs for a control plane and data plane VLANs (virtual Local Area Networks) in cases where a distributed virtual switch is deployed. The need for multiple NIC cards arises from a need to guarantee uninterrupted management access to each server and distributed virtual switch and to provide a minimum bandwidth for memory copy operations.

At the same time, each additional network interface increases the cost, cabling complexity, and energy consumption within the data center. Further, each additional card generates heat which increases cooling requirements, also driving up the cost of running the data center. Thus, data center operators are interested in reducing this proliferation of NICs and HBAs to reduce data center complexity as well as cost and power consumption.

A simple approach is to use 10 Gigabit Ethernet cards and using VLANs to separate different traffic types. However, VLANs do not provide any guarantee in terms of bandwidth to any particular quality of service classification. Furthermore, it is important to note that the first congestion point for the traffic on a virtualized server is the Ethernet link between the virtualized server and the attached physical switch. This is because the physical NIC in the in the virtualized server is shared among competing traffic flows from different virtual machines, as well as the management traffic that enables the server virtualization functionalities, so the concept of traffic prioritization needs to be applied between the server itself and the switch, rendering VLANs alone insufficient.

SUMMARY

Embodiments disclosed herein provide for virtualized server kernel and virtual networks consolidation. One embodiment of the disclosure includes a computing system having a processor and a physical network interface. The physical network interface may be configured to schedule data frames for transport on a physical Ethernet network according to (i) a Class of Service (CoS) tag added to a given data frame and (ii) a minimum bandwidth allocation. The Classes of Service may include at least a first class for virtualized server management traffic and a second class for inter-host virtual machine migration traffic. Further, the minimum bandwidth allocation guarantees at least a fraction of bandwidth available from the physical network interface device to the virtualized server management traffic and to the virtual machine migration traffic. The computing system may also include a memory containing a hypervisor running a virtual switching device. The virtual switching device may be configured to add the CoS tags to data frames received from virtual network interfaces provided to virtual machines executing on the computing system.

In a particular embodiment, the physical network interface device on the computing system comprises a 10 Gb Ethernet network adapter. Further, the Classes of Service may be defined according to the 802.1p standard and the CoS tags may conform to the 802.1Q standard. Similarly, the minimum bandwidth allocations may be defined according to the 802.1Qaz Enhanced Transmission. Further still, the plurality of Classes of service may also include a third class for network storage traffic, e.g., Network File System (NFS) traffic, Fibre Channel over Ethernet (FCoE) traffic, or iSCSI traffic. The plurality of Classes of Service may also include a fourth class for virtualized servers switch control plane traffic.

In a particular embodiment, the hypervisor may be configured to migrate a virtual machine running on one host to another over the consolidated network. For example, the hypervisor may receive a request to migrate a selected one of the virtual machines on the computing system to a second computing system. In response, the hypervisor may continue operation of the selected virtual machine and a virtualized server switching device on the hypervisor while it may tag frames containing memory data as belonging to the inter-host virtual machine migration traffic class, and the physical network interface may schedule the data frames tagged as migrating the virtual machine to provide at least the fraction of bandwidth allocated to the inter-host migration traffic class. A hypervisor on a second computing system initiates execution of the selected virtual machine on the second computing system once the memory information between the two systems is in synch.

BRIEF DESCRIPTION OF THE DRAWINGS

So that the manner in which the above recited features of the embodiments described herein can be understood in detail, a more particular description may be had by reference to embodiments, some of which are illustrated in the appended drawings. It is to be noted, however, that the appended drawings illustrate only typical embodiments are therefore not to be considered limiting of its scope.

DETAILED DESCRIPTION

Figure 1:
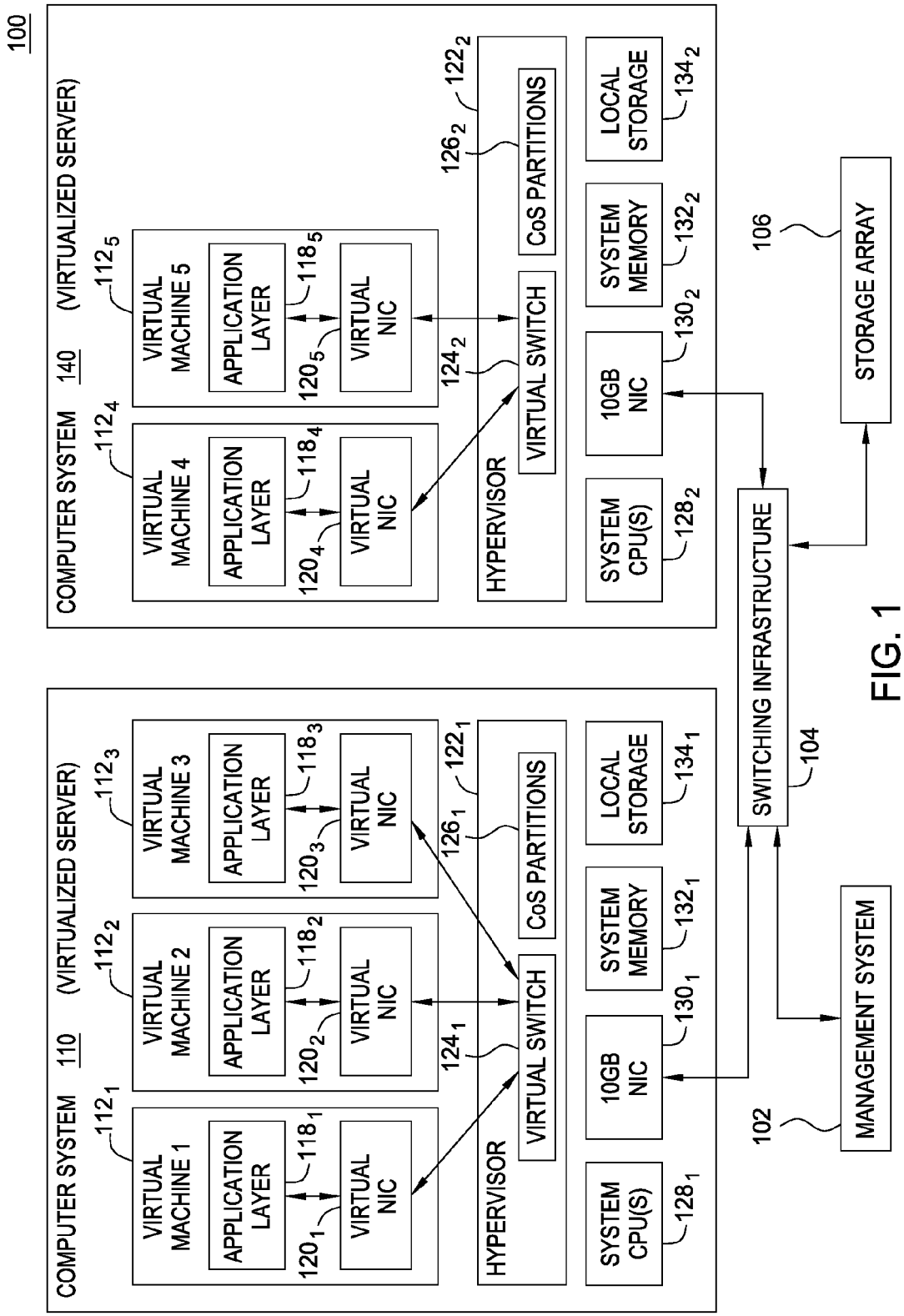
FIG. 1 is a block diagram illustrating an example computing environment, according to one embodiment.

Server virtualization environments have different classes of network traffic which need end-to-end bandwidth protection to guarantee the reliable operation of a server (or cluster of servers) running multiple virtual machines. Traffic separation is needed for virtualized servers to function properly. For example, if hypervisor management traffic is shared on the same network as production traffic, virtual machine migration can fail if adequate bandwidth is not available. Similarly, if storage traffic shares the same network as the production traffic, and the production traffic overruns the storage traffic, this can severely disrupt the functioning of the virtual machine. Similarly, control plane traffic used to manage virtual switching modules needs to be protected to guarantee the functioning of a cluster of servers running multiple virtual machines.

Embodiments described herein allow server clusters running virtual machines to migrate from an infrastructure built around using distinct gigabit Ethernet Network Adapters to carry system virtualization traffic and inter-host migration traffic to an infrastructure using a single, consolidated 10 gigabit Ethernet adapter. Additional 10 gigabit Ethernet adapters may be added for redundancy. In one embodiment, multiple data traffic priority classes (classes of service) are defined, each priority class describing a different class of network traffic for virtualized servers. Doing so significantly reduces the number of NICs and HBAs used on virtualized servers in the data center.

For example, in one embodiment, different classes of service are defined using a 3-bit user priority field. The field may be stored in an IEEE 802.1Q (VLAN Tagging) header, which is added to data frames moving over the data center Ethernet. Network interfaces on each physical server, as well as the switching infrastructure at the data center, utilize the assigned classes to provide priority groups with a minimum bandwidth for traffic between a virtual switch on the virtualized server, a physical network interface on a virtualized server and other switches in the data center infrastructure. Thus, embodiments described herein support consolidation of multiple, distinct physical links onto one shared link, while preserving the ability to perform virtual machine migration or access IP-based storage, even under heavy production traffic loads. Accordingly, the problem of port proliferation on virtualized servers is reduced, as is the overall power consumption, all while continuing to provide an equivalent service level.

In one embodiment, a 10 Gb Ethernet network adapter on a server implements a version of the enhanced transmission selection standard (e.g., the IEEE 802.1Qaz standard) to provide a minimum bandwidth guarantee to different traffic priority classes. The enhanced transmission selection standard allows a defined amount network bandwidth to be dedicated and available to different priority classes. The priority classes may be defined to create virtual network links for the hypervisor control plane and virtual machine migration network, previously implemented using separate physical network links and associated infrastructure. Further, a virtual switch managing traffic for multiple virtual machines running on a physical server may be configured to recognize and enforce priority class tagging as does the physical switching infrastructure connecting a cluster of servers running virtual machines. At the same time, one traffic class may consume unused bandwidth from others, improving system efficiency and utilization.

By defining priority classes (and minimum bandwidth guarantees) for virtualized server management traffic and for inter-host virtual machine migration traffic, it is possible to virtualize each path between a hypervisor and the network infrastructure, providing the equivalent traffic protection and separation of a physical wire and multiple dedicated networks and network interfaces. Thus, number of physical ports on virtualized servers may be reduced, which simplifies management, reduces power consumption and overall cost. Further, there is more flexibility in allocating the bandwidth to different traffic classes on a virtualized server than on a physical wire. At the same time, virtual machine migration traffic is protected thus allowing disaster recovery operations, server evacuation, load balancing, and so forth.

This disclosure references various embodiments. However, it should be understood that this disclosure is not limited to embodiments described herein. Instead, any combination of the following features and elements, whether related to different embodiments or not, is contemplated to implement and practice an embodiment. Furthermore, in various embodiments, embodiments provide numerous advantages over the prior art. However, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s).

FIG. 1 is a block diagram illustrating an example computing 100 environment, according to one embodiment. As shown, computing environment 100 provides a simplified example of a data center having a virtualized computing system 110, 140 both connected to switching infrastructure 104. The computing environment 100 also includes a storage array 106 and a management system 102. The management system 102 may provide a computer configured with the appropriate software applications to manage the virtual machines $112_{1-5}$, executing on computer systems 110 and 140. For example, the management system 102 may monitor the relative performance of computer systems 110 and 140 and decide for load balancing reasons to migrate virtual machine $112_3$ running on computer system 110 to computer system 140.

Illustratively, computing systems $110_{1-2}$ each include one or more system CPUs 128, a 10 Gb Ethernet network interface card (NIC) 130, system memory 132, and local storage 134. Running on top of the system hardware is a hypervisor 122, which includes a virtual switch 124 and definitions for Class of Service (Cos) priorities 126. In one embodiment, the hypervisor $122_{1-2}$ may be implemented as a software layer that runs directly on the system hardware of computer systems 110 and 140 intercepting some, or all, operating system calls to the hardware. Further, the hypervisor $122_{1-2}$ may provide a virtual CPU and memory to virtual machines $112_{1-5}$ The hypervisor 122 generally executes using a specially privileged kernel that can access hardware devices and can create/destroy virtual machines (guests) on the computing system 110 (e.g., virtual machines $112_{1-3}$). Thus, virtual machines $112_{1-3}$ running on the computing system 110 share the system hardware (e.g., CPU 128, system memory 132), but are not generally aware of the system hardware directly. Instead, the hypervisor 122 provide virtual hardware for virtual machines $112_{1-3}$.

Each virtual machine 112 may load and run an operating system on the virtual hardware exposed by the hypervisor 122. Together, the virtual hardware and operating system provides a virtualized computing platform for applications to run in an application layer 118 of a given virtual machine 112.

As shown, the hypervisor 122 on computer systems 110 and 140 each includes a virtual switch 124. The virtual switch 124 provides a virtualized switching device for the virtual machines $112_{1\text{-}3}$ associated with the physical interface provided by 10 Gb Ethernet NIC 130. The virtual switch 124 may enforce network policy and access control by the virtual network interfaces (virtual NICs) $120_{1\text{-}3}$ on the virtual machines $112_{1\text{-}3}$. For example, the virtual switch 124 may provide a firewall and virtual network discovery capabilities as well as enable policy based switching and traffic monitoring for network traffic flowing to/from virtual NICs $120_{1\text{-}3}$. Further, in one embodiment, the virtual switch 124 may be configured to share policy based switching information or rules associated with one of the virtual machines 112 when such a machine is migrated from one physical host (e.g., computer system 110) to another (e.g., computer system 140).

Figure 2:
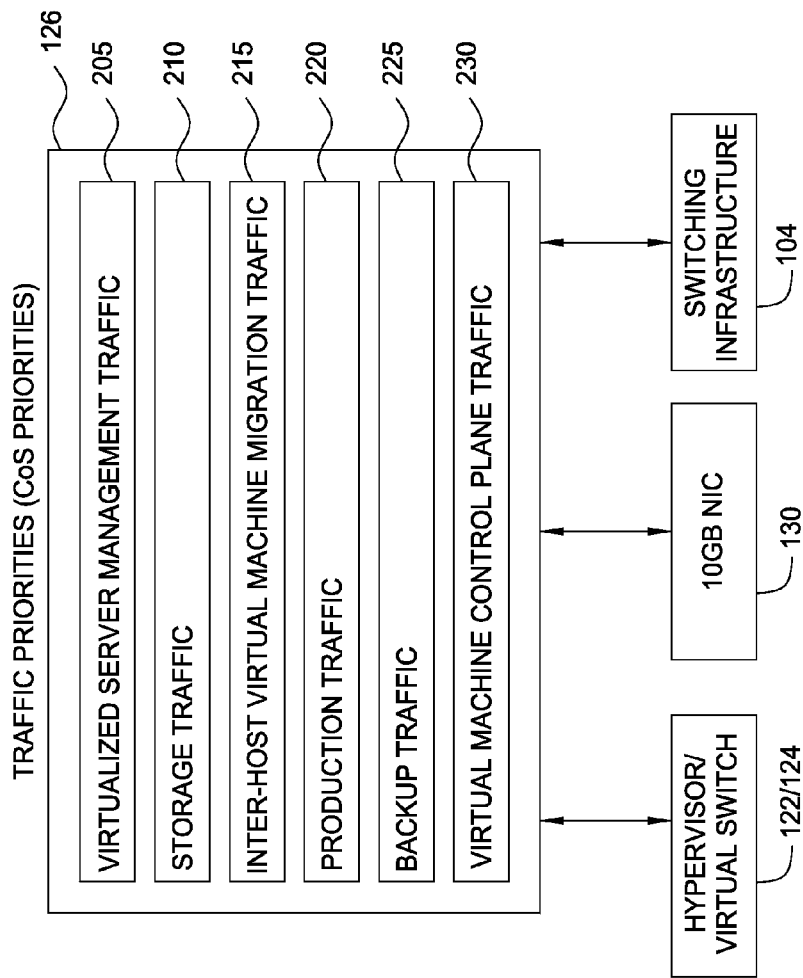
FIG. 2 illustrates a collection of traffic classes of service for consolidating networks on a virtualized server, according to one embodiment.

The CoS priorities 126 may be used to define different network traffic classes which require bandwidth protection and traffic separation from each other as needed to guarantee the reliable operation of computing environment 100. For example, FIG. 2 illustrates a collection of network traffic classes of service (CoS) for virtualized server kernel and virtual network consolidation, according to one embodiment. As shown, the CoS priorities 126 include a virtualized server management traffic class 205, an inter-host virtual machine migration traffic class 215, a storage traffic class 210, a production traffic class 220, a backup storage traffic class 225, and virtual machine control plane traffic class 230. In one embodiment, the traffic classes may be designated using the IEEE 802.1p standard, which allows for up to eight different classes of service to be defined, where each class is expressed using a 3-bit user priority field in an IEEE 802.1Q header added to a given data frame. Additionally, different traffic classes may be guaranteed a minimum amount of bandwidth using an enhanced transmission standard (e.g., the IEEE 802.1Qaz standard).

The virtualized server management traffic class 205 includes the network traffic necessary to manage and control the operation of the virtualized host including the virtual switch 124 running inside hypervisor 122. To reliably maintain the ability to manage a server virtualization environment, a minimum bandwidth is guaranteed for traffic tagged as belonging to the virtualized server management traffic class 205. Management traffic includes traffic between the management system 102 and the hypervisor 122 or virtual switch 124, as well as traffic between the management system 102 and any of the virtual machines 112.

The inter-host virtual machine migration traffic class 215 includes network traffic related to the migration of a virtual machine from one physical host system to another. Currently, some vendors of server virtualization products allow a migration of a virtual machine between physical host systems, while the virtual machine is powered on and operational. This migration typically requires the availability of the virtual machine's disk on both the originating host and the target host, but also that the target host receive a copy of the current memory content of the originating host before the actual migration can occur. The migration process mechanism needs a high bandwidth link during a migration. Depending on the implementation of the migration process mechanism, the period when the actual bandwidth is higher may occur at (or near) the beginning or the end of the migration process. In one embodiment, a specific traffic class is defined for inter-host virtual machine migration traffic to guarantee minimum bandwidth for migrating a virtual machine from one host to another. At the same time this guaranteed bandwidth can be used by other classes when no inter-host virtual machine migration traffic is moving across the data center Ethernet.

The storage traffic class 210 includes any kind of traffic between a virtual host and a remote storage system over Ethernet (e.g., traffic between any of the virtual machines 112 and the storage array 106 of FIG. 1). Examples of this traffic include iSCSI and Network File System (NFS) traffic, as well as Fibre Channel traffic, if Fibre Channel over Ethernet (FCoE) is used. The performance of a server virtualization environment depends in part on the storage I/O. Thus, dedicating a traffic class (and guaranteed bandwidth) to this traffic classes ensures that data frames are delivered to the storage solution (i.e., to storage array 106) without any traffic drops. Additionally, back-up traffic 220 includes any kind of network traffic directed to a redundant storage array.

Production traffic class 225 includes any traffic between virtual machines and other virtual machines or outside nodes. Network traffic tagged as belonging to the production traffic class usually does not require any bandwidth guarantees and can be handled in a best effort way.

The virtual machine control plane traffic class 230 includes any traffic from the virtual switch 124 on one computer system directed to/form the virtual switch 124 on another computer system. As noted above, the inter-host virtual machine migration traffic class 215 may be used to separate and prioritize traffic migrating a virtual machine from one host to another. In conjunction with this, the control plane traffic class 230 may be used to migrate the network policy associated with such a virtual machine from an originating host to the target host.

In one embodiment, the assignment of a class of service to a traffic frame occurs on the virtualized server itself (e.g., by virtual switch 124) to resolve traffic contention from virtual machines 112 over the consolidated physical network interface on that server (e.g., 10 Gb Ethernet NIC 130). That is contention between traffic generated by the virtual NICs or by the hypervisor 122 all of which compute for access to the 10 Gb Ethernet NIC 130. Note, the use of VLAN tags and CoS is independent. Thus, it is possible to utilize the same VLAN by different traffic classes with different CoS values, just as it is also possible to use different VLANs with the same CoS value. Accordingly, in one embodiment, a Protected Virtual Link Group—given by the tuple (VLAN ID, CoS Bit)—is defined inside a virtual host. The VLAN ID is utilized by the physical switch attached to the virtual host in (e.g., switching infrastructure 104) linked to computer systems 110 and 140) in order to logically separate traffic, while the CoS Bit is used by the network adapter on the virtualized server to enforce bandwidth guarantees.

Additionally, the physical switching infrastructure 104 may include a switch configured to communicate with the virtual switches 124 using a bridging capability exchange protocol (DCBX). DCBX runs on the physical Ethernet link between the physical switch and a converged network adapter (e.g., the 10 Gb Ethernet NICs $130_{1\text{-}2}$ on the computer systems 110, 140). The DCBX protocol allows the switch to negotiate capabilities with the 10 Gb Ethernet NIC $130_{1\text{-}2}$ and to send configuration values to the adapter. The adapters connected to the switch are programmed to accept the configuration values sent by the switch, allowing the switch to distribute configuration values to all attached adapters. The capability reduces the possibility of configuration error and simplifies administration of the physical network adapters on the virtualized servers 110, 140.

In one embodiment, an administrator may configure the CoS values and the associated bandwidth on one of the physical switches in switching infrastructure 104. In turn, the switch may "push" the information via DCBX into the attached virtualized servers. For example, a switch in the physical switching infrastructure 104 could push the following allocation of bandwidth for the traffic classes illustrated in FIG. 2 to the 10 Gb Ethernet NICs 130 and virtual switches 124.

TABLE 1

Example Traffic Classes

Storage Classes (e.g., FCoE): configured to use ~2-4 Gbps of bandwidth (20-40% of the available bandwidth)
Production Class (virtual machine production traffic): no bandwidth guarantee (Best effort delivery)
Inter-host Migration Class (virtual machine migration): dedicated 1 Gbps per server (10% of the bandwidth)
virtual machine Control Plane Traffic Class: dedicated 1 Gbps of traffic (10% of the bandwidth)
virtual machine Management Traffic Class: priority class, 1 Gbps of traffic (10% of the bandwidth)

As this example illustrates, the 10 Gb Ethernet network provides adequate bandwidth to consolidate the storage traffic, virtualized server management traffic, inter-host migration traffic, virtual machine control plane traffic, and still have adequate bandwidth for the virtual machine production traffic.

Figure 3:
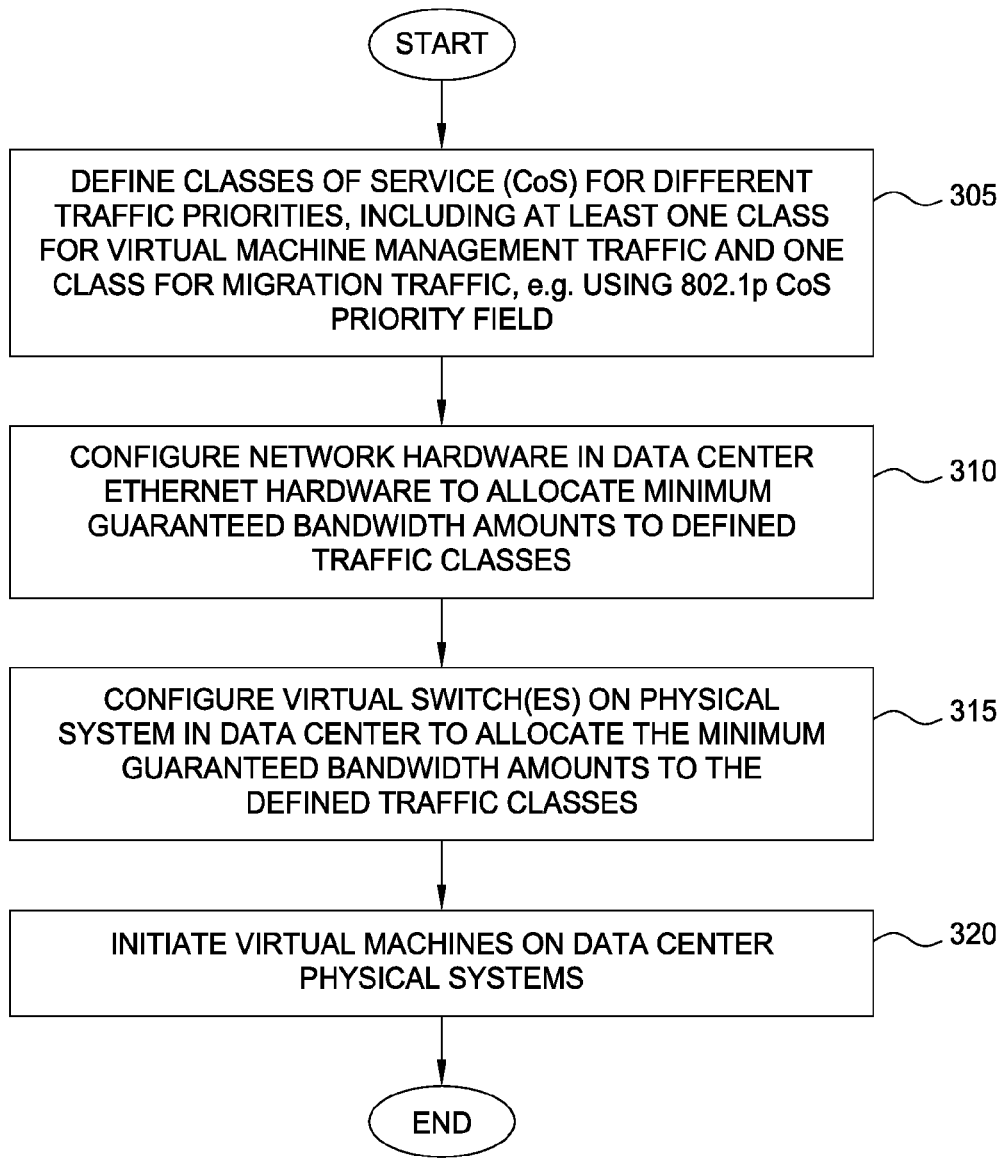
FIG. 3 illustrates a method for configuring a data center network for consolidating networks on a virtualized server, according to one embodiment

FIG. 3 illustrates a method 300 for consolidating virtualized server kernel and virtual networks in a data center, according to one embodiment. As shown the method begins at step 305, where classes of services are defined for different traffic classes. For example, in one embodiment, the traffic classes may be defined using the 802.1p priority field. Further the defined traffic classed may include at least one class for virtualized server management traffic and one class for inter-host virtual machine migration traffic. Additionally, as noted above, the traffic classes may also be defined for storage traffic, virtual machine control plane traffic, and for production traffic generated by the virtual machines running on the physical hosts of the data center.

At step 310, the network hardware in the data center Ethernet is configured to allocate minimum guaranteed bandwidth amounts to the defined traffic classes. As noted above, once configured, a switch push CoS values and minimum bandwidth allocations to the network adapters on the virtualized servers of the data center (e.g., computer systems 110, 140) using the DCBX protocol. Additionally, the network hardware is configured to tag data frames as belonging to a particular class of service. For example, in Table I, above, the storage class is allocated as much as 4 Gbps, and the virtual machine control plane and inter-host migration traffic classes are each guaranteed a minimum of 1 Gbps of bandwidth. In one embodiment, the hardware includes a 10 Gb Ethernet interface on each physical system hosting virtual machines, as well as 10 Gb Ethernet physical switching elements in the data center.

At step 315, the virtual switch 124 on each physical system (e.g., computer systems 110, 140) hosting virtual machines is configured to tag network traffic as belonging to one of the defined traffic classes. Importantly, as noted above, the first congestion point for the traffic on a virtualized server is the Ethernet link between the virtualized host and the attached switch. This is because the physical NIC in the host is shared among competing traffic flows from different virtual machines, as well as the management traffic that enables the server virtualization functionalities. Accordingly, traffic prioritization is applied on traffic between the virtual switch 124 and the physical interface on a given host (e.g, 10 Gb Ethernet NIC 130).

At step 320, once the traffic classes are defined and the minimum bandwidth allocation guarantees are configured on the physical and virtual network elements, the virtual machines may be brought up and executed on the data center physical systems.

Figure 4:
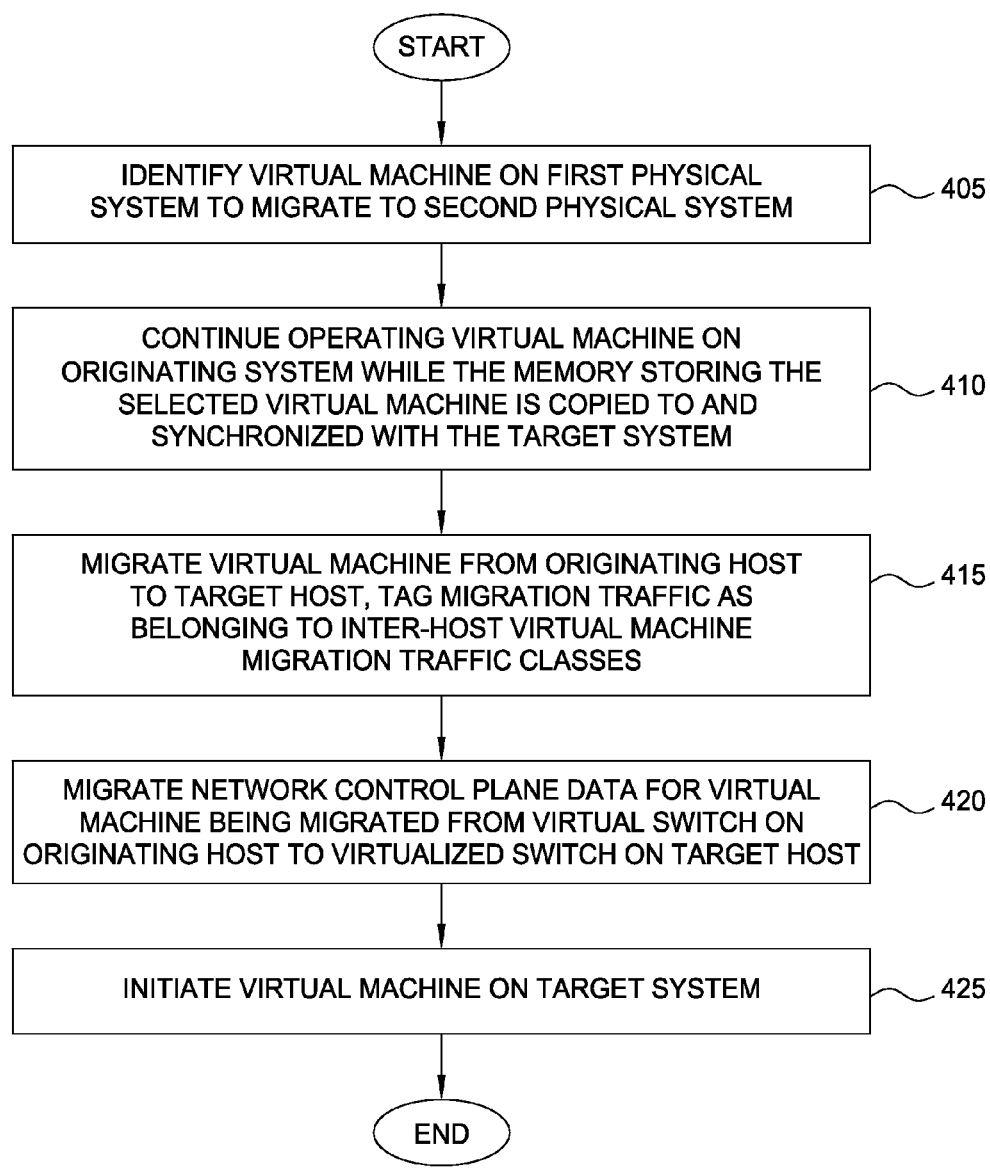
FIG. 4 illustrates a method for virtual machine migration across a consolidated data center network, according to one embodiment.
Figure 5:
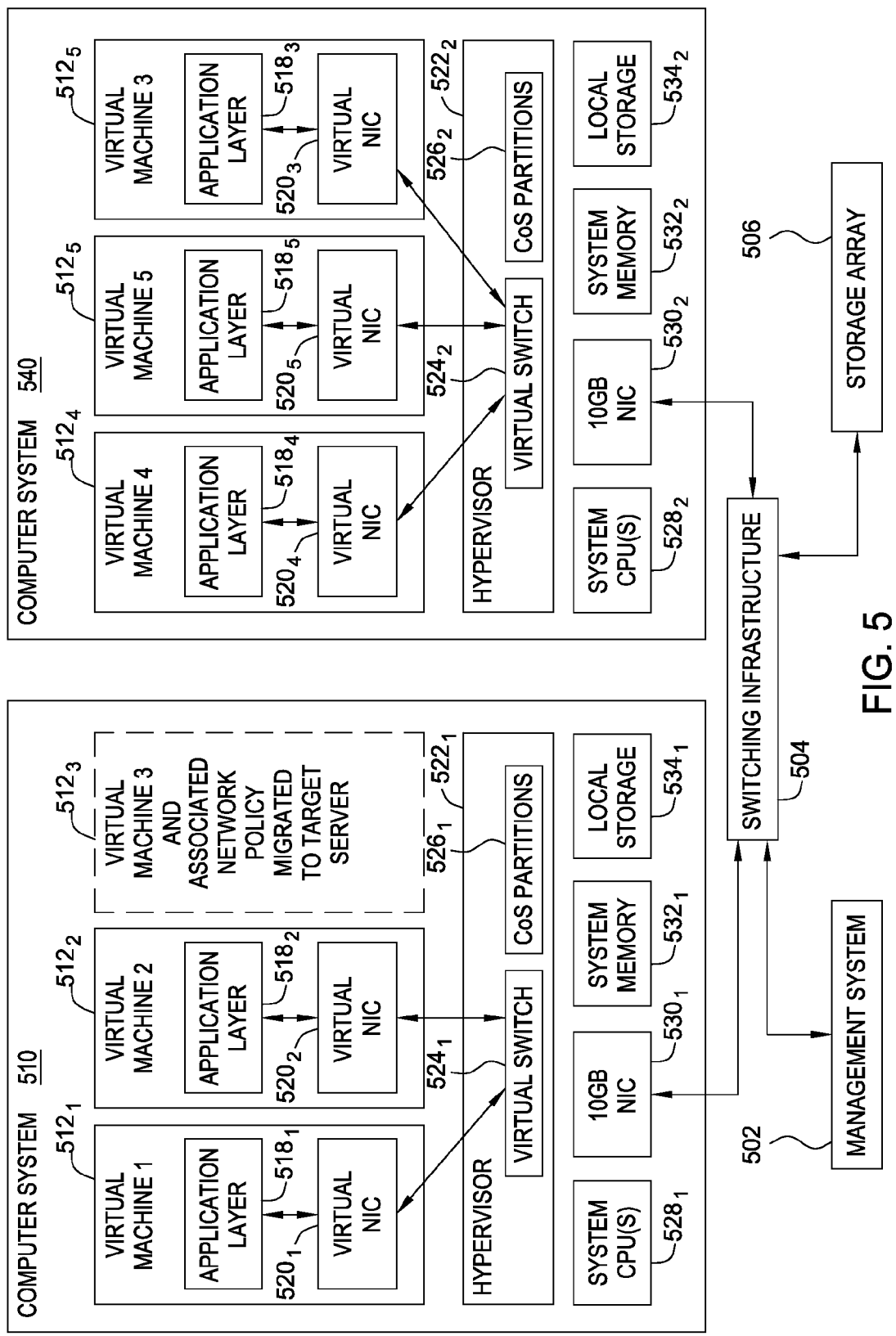
FIG. 5 is a block diagram illustrating a virtual machine being migrated from one server to another over a consolidated data center network, according to one embodiment.

FIG. 4 illustrates a method 400 for virtual machine migration across a consolidated data center network, according to one embodiment. As shown, the method 400 begins at step 405, where a virtual machine on an originating host is selected to be migrated to a target host. For example, as noted above a virtualized server management system may monitor and evaluate the performance of a cluster of servers hosting virtual machines and identify an opportunity to move a virtual machine from one physical host to another, e.g., to provide for better load balancing in the cluster. Similarly, a physical host may be brought down in order to patch the hypervisor or other system components on that physical host. In such a case, the management system may be used to migrate each virtual machine on that host to others—allowing for system upgrades or other of-line functions to be performed. For example, FIG. 5 is a block diagram illustrating a virtual machine, after being migrated from one server to another over a consolidated data center network, according to one embodiment. As shown, FIG. 5 illustrates the same example data center environment shown in FIG. 1. However, the virtual machine 112₃—originally executed on computer system 110—is now shown being executed by the hypervisor 122₂ on computer system 140. Steps 410-425 illustrate an example of migrating a virtual machine using a data center network which implements virtualized server kernel and virtual networks consolidation, according to one embodiment.

At step 410, the hypervisor on the originating system continues operating the selected virtual machine while the memory storing that machine is copied and synchronized with the target system. For example, the management system 102 may send a message to the appropriate hypervisor identifying the virtual machine to migrate, along with an indication of the target host. In one embodiment, the messages sent by the management system are identified as traffic belonging to the virtualized server management traffic class. Accordingly, when the network interface on the management system receives the traffic, it may be encapsulated in an Ethernet frame tagged as belonging to this traffic class. Further, the scheduling algorithms on the network interface are configured to queue and forward such traffic as so as to guarantee the allocated bandwidth to this traffic class.

At step 415, the hypervisor on the originating virtual machine migrates the virtual machine being to the target host. As noted above, this migration typically requires the availability of the virtual machine's disk on both originating host and the target hosts, but also that the target host receive a copy of the current memory content of the originating host before the actual migration can occur. To facilitate the migration, traffic from the virtualized switch 124 is tagged as belonging to the inter-host migration class, which is given a high priority (i.e., low latency) by the physical network interface and this traffic class is provided with enough minimum allocated bandwidth to perform the migration. Once tagged, the selected virtual machine is transmitted from the first computing system to the second computing system and the data frames tagged as migrating the virtual machine are allocated at least the fraction of bandwidth allocated to the inter-host migration traffic class.

At step 420, the hypervisor on the originating host sends the target host any control plane data needed by the virtual machine migrated to the target host in step 415. And at step 425, the hypervisor on the target host initiates the migrated virtual machine on the target host.

Advantageously, embodiments described herein provide a method to define, a set of traffic classes for a consolidated data center network, including, e.g., a traffic class for virtual machine migration traffic, a traffic class for virtualized server management, a traffic class for storage access (regardless of whether it is iSCSI, NFS or FCoE), and a traffic class for production traffic. Further, embodiments described herein provide a method by which the virtualized switches within the virtualized server can allocate a defined minimum bandwidth of the bandwidth to each of the defined traffic classes. Optionally a maximum boundary may also be specified. In one embodiment, IEEE 802.1p Class of Service (CoS) values are assigned to traffic classes for migration, management, storage and virtual machines. Once the traffic classes are defined, a 10 Gb network interface card (NIC) on a system hosting multiple virtual machine may perform traffic class scheduling to ensure the same bandwidth allocation to the traffic classes as is provided on the virtualized switch. Doing so ensures relative bandwidth allocation across the switching fabric between any two pairs of Virtualized servers participating in a virtual machine migration as well as ensures relative m relative bandwidth allocation across the switching fabric between virtualized servers and storage devices.

While the foregoing is directed to embodiments of the present disclosure, other and further embodiments of the disclosure may be devised without departing from the basic scope thereof, and the scope thereof is determined by the claims that follow.

What is claimed is:

1. A computing system, comprising:
   a processor;
   a physical network interface device configured to schedule data frames for transport on a physical Ethernet network according to (i) a Class of Service (CoS) tag added to a given data frame and (ii) a minimum bandwidth allocation, wherein the Classes of Service include at least a first class for virtualized server management traffic and a second class for inter-host virtual machine migration traffic, and wherein the minimum bandwidth allocation guarantees at least a fraction of bandwidth available from the physical network interface device to the virtualized server management traffic and to the inter-host virtual machine migration traffic; and
   a memory containing a hypervisor running a virtual switching device configured to add the CoS tags to data frames received from a virtual network interface provided to a virtual machine executing on the computing system.

2. The computing system of claim 1, wherein the physical network interface device on the computing system comprises a 10 Gb Ethernet network adapter.

3. The computing system of claim 1, wherein the Classes of Service are defined according to an 802.1p standard and wherein the CoS tags are added to the data frames according to an 802.1Q standard.

4. The computing system of claim 1, wherein the minimum bandwidth allocations are defined according to an 802.1Qaz Enhanced Transmission Standard and the data frames are scheduled for transport on the physical Ethernet network according to the 802.1Qaz Enhanced Transmission Standard.

5. The computing system of claim 1, wherein the plurality of Classes of Service further includes a third class for network storage traffic, and wherein the wherein the minimum bandwidth allocation guarantees at least a fraction of bandwidth available from the physical network interface to the network storage traffic.

6. The computing system of claim 5, wherein the network storage traffic comprises at least one of Network File System (NFS) traffic, Fibre Channel over Ethernet (FCoE) traffic, and iSCSI traffic.

7. The computing system of claim 1, wherein the plurality of Classes of Service further includes a fourth class for virtual switch control plane traffic, and the wherein the minimum bandwidth allocation guarantees at least a fraction of bandwidth available from the physical network interface to the virtual switch control plane traffic.

8. The computing system of claim 1, wherein the hypervisor is configured for:
   receiving a message stored in data frames tagged as belonging to the virtualized server management traffic class, wherein the message is a request to migrate a selected one of the virtual machines on the computing system to a second computing system;
   tagging, by the virtual switching device on the hypervisor, data frames migrating the selected virtual machine as belonging to the inter-host virtual machine migration traffic class;
   transmitting the selected virtual machine from the computing system to the second computing system, wherein the data frames tagged as belonging to the inter-host virtual machine migration traffic class are allocated at least the fraction of bandwidth allocated to the inter-host migration traffic class, and wherein a hypervisor on a second computing system initiates execution of the selected virtual machine on the second computing system.

9. A computer-implemented method for consolidating virtualized server kernel and virtual networks in a data center, comprising:
   defining a plurality of Classes of Service (CoS) for network traffic, including, at least a first class for virtualized server management traffic and a second class for inter-host virtual machine migration traffic;
   defining a minimum bandwidth allocation to guarantee at least a fraction of bandwidth provided by a physical Ethernet network to the virtualized server management traffic and to the inter-host virtual machine migration traffic;
   adding a CoS tag to data frames originating from a computing system executing a hypervisor and one or more virtual machines, wherein each CoS tag identifies the respective data frame as belonging to one of the defined plurality of Classes of Service; and
   scheduling, by a physical network interface device on the computing system, each data frame for transport on the physical Ethernet network according to the respective CoS tag and the minimum bandwidth allocation.

10. The computer-implemented method of claim 9, wherein the data frames are received from a virtual network interface provided to each of the one or more virtual machines executing on the computing system and wherein a virtual switch running inside the hypervisor adds the CoS tags to the respective data frames.

11. The computer-implemented method of claim 10, wherein the physical network interface device on the computing system comprises a 10 Gb Ethernet Network Adapter.

12. The computer-implemented method of claim 9, wherein the Classes of Service are defined according to an 802.1p standard and wherein the CoS tags are added to the data frames according to an 802.1Q standard.

13. The computer-implemented method of claim 9, wherein the minimum bandwidth allocations are defined according to an 802.1Qaz Enhanced Transmission Standard and the data frames are scheduled for transport on the physical Ethernet network according to the 802.1Qaz Enhanced Transmission Standard.

14. The computer-implemented method of claim 9, wherein the plurality of Classes of Service further include a third class for network storage traffic, and wherein the method further comprises defining a minimum bandwidth allocation to guarantee at least a fraction of bandwidth provided by the physical Ethernet network to the network storage traffic.

15. The computer-implemented method of claim 14, wherein the network storage traffic comprises at least one of Network File System (NFS) traffic, Fibre Channel over Ethernet (FCoE) traffic, and iSCSI traffic.

16. The computer-implemented method of claim 9, wherein the plurality of Classes of Service further include a fourth class for virtual switch control plane traffic, and wherein the method further comprises defining a minimum bandwidth allocation to guarantee at least a fraction of bandwidth provided by the physical Ethernet network to the virtual switch control plane traffic.

17. The computer-implemented method of claim 9, further comprising:
  receiving a message encapsulated in data frames tagged as belonging to the virtualized server management traffic class, wherein the message is a request to migrate a selected one of the virtual machines on the computing system to a second computing system;
  tagging, by a virtual switch on the computing system, data frames for migrating the selected virtual machine as belonging to the inter-host virtual machine migration traffic class;
  transmitting, over the physical Ethernet network, the selected virtual machine from the computing system to the second computing system, wherein the data frames tagged as belonging to the inter-host virtual machine migration traffic class are allocated at least the fraction of bandwidth allocated to the inter-host virtual machine migration traffic class; and
  initiating execution of the selected virtual machine by a hypervisor on the second computing system.

18. A non-transitory computer-readable storage medium containing a virtual machine hypervisor and a virtual switch which, when executed on a processor, performs an operation for consolidating virtual machine networks in a data center, the operation comprising:
  defining a plurality of classes of service (CoS) for network traffic, including, at least a first class for virtualized server management traffic and a second class for inter-host virtual machine migration traffic;
  defining a minimum bandwidth allocation to guarantee at least a fraction of bandwidth provided by a physical Ethernet network to the virtualized server management traffic and to the inter-host virtual machine migration traffic;
  adding a CoS tag to data frames originating from a computing system executing the virtual machine hypervisor and one or more virtual machines, wherein each CoS tag identifies the respective data frame as belonging to one of the defined plurality of classes of service; and
  transmitting the tagged data frames to a physical network interface device on the computing system, wherein the physical network interface device is configured to schedule each data frame for transport on the physical Ethernet network according to the respective CoS tag and the minimum bandwidth allocation.

19. The computer-readable storage medium of claim 18, wherein the physical network interface device on the computing system comprises a 10 Gb Ethernet Network Adapter.

20. The computer-readable storage medium of claim 18, wherein the Classes of Service are defined according to an 802.1p standard and wherein the CoS tags are added to the data frames according to an 802.1Q standard.

21. The computer-readable storage medium of claim 18, wherein the minimum bandwidth allocations are defined according to an 802.1Qaz Enhanced Transmission Standard and the data frames are scheduled for transport on the physical Ethernet network according to the 802.1Qaz Enhanced Transmission Standard.

22. The computer-readable storage medium of claim 18, wherein the plurality of Classes of Service further include a third class for network storage traffic, and wherein the operation further comprises defining a minimum bandwidth allocation to guarantee at least a fraction of bandwidth provided by the physical Ethernet network to the network storage traffic.

23. The computer-readable storage medium of claim 22, wherein the network storage traffic comprises at least one of Network File System (NFS) traffic, Fibre Channel over Ethernet (FCoE) traffic, and iSCSI traffic.

24. The computer-readable storage medium of claim 18, wherein the plurality of classes of service traffic further include a fourth class for virtual switch control plane traffic, and wherein the operation further comprises defining a minimum bandwidth allocation to guarantee at least a fraction of bandwidth provided by the physical Ethernet network to the virtual switch control plane traffic.

25. The computer-readable storage medium of claim 18, wherein the operation further comprises:
  receiving a message encapsulated in data frames tagged as belonging to the virtualized server management traffic class, wherein the message is a request to migrate a selected one of the virtual machines on the computing system to a second computing system;
  tagging, by the virtual switch on the computing system, data frames migrating the selected virtual machine as belonging to the inter-host virtual machine migration traffic class;
  transmitting, over the physical Ethernet network, the selected virtual machine from the computing system to the second computing system, wherein the data frames tagged as belonging to the inter-host virtual machine migration traffic class are allocated at least the fraction of bandwidth allocated to the inter-host virtual machine migration traffic class; and
  initiating execution of the selected virtual machine by a hypervisor on the second computing system.

* * * * *